July 1, 1969  F. S. ENGELKING  3,452,995
AXIALLY NARROW METAL FACE SEALS
Filed Sept. 21, 1967  Sheet 1 of 4
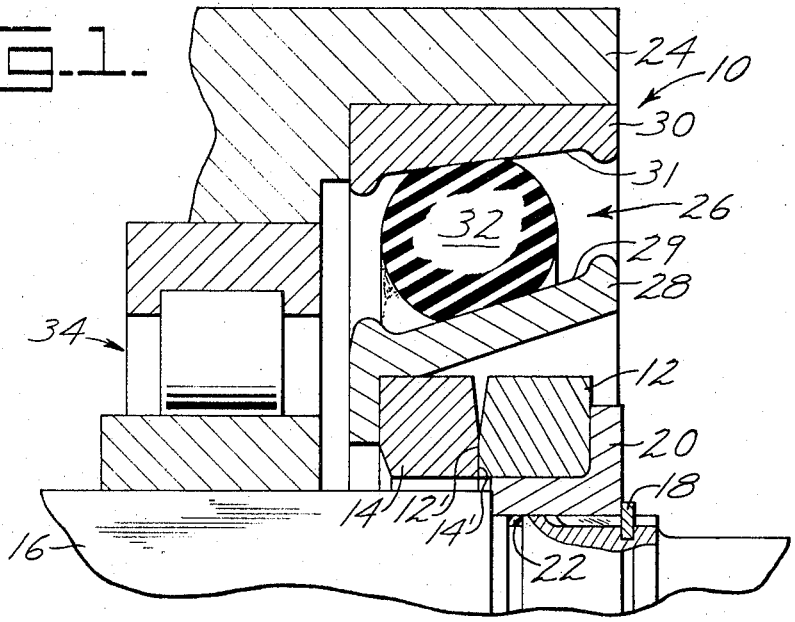
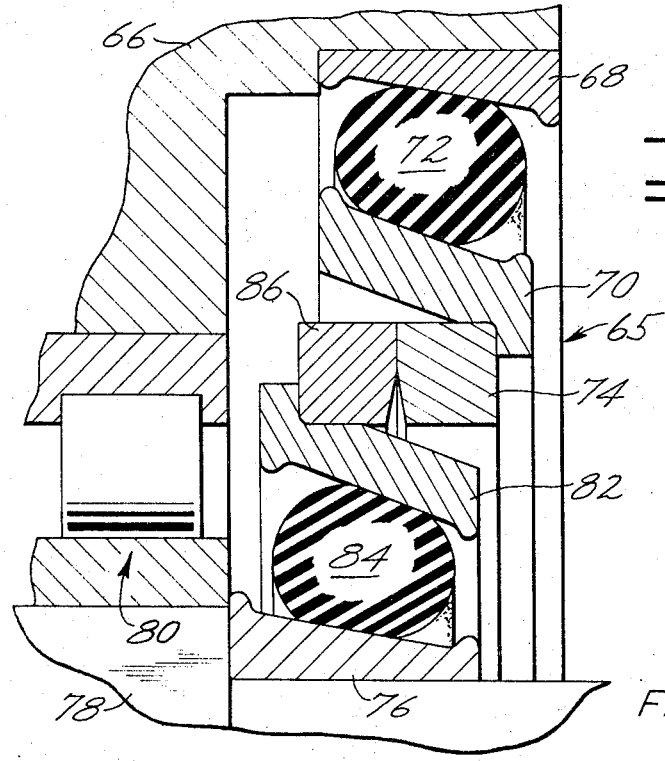
INVENTOR.
FREDERICK S. ENGELKING
BY
ATTORNEYS

INVENTOR.
FREDERICK S. ENGELKING

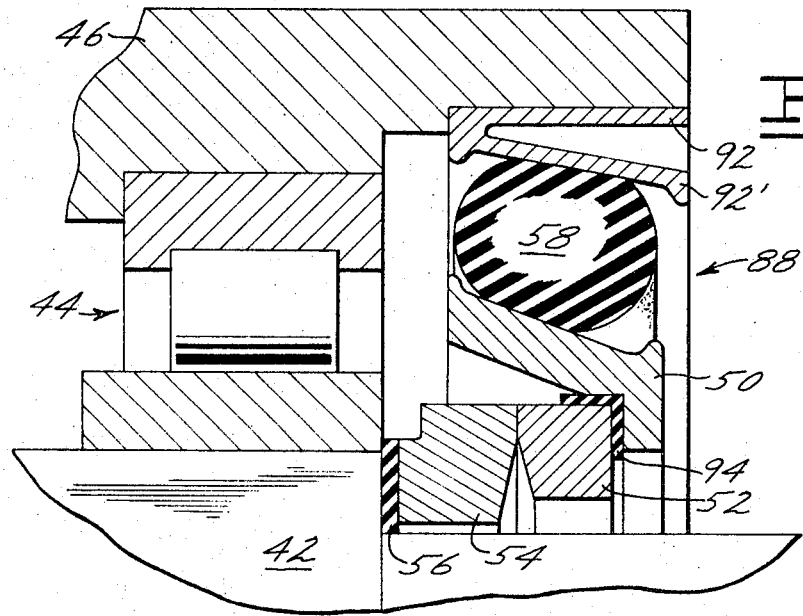
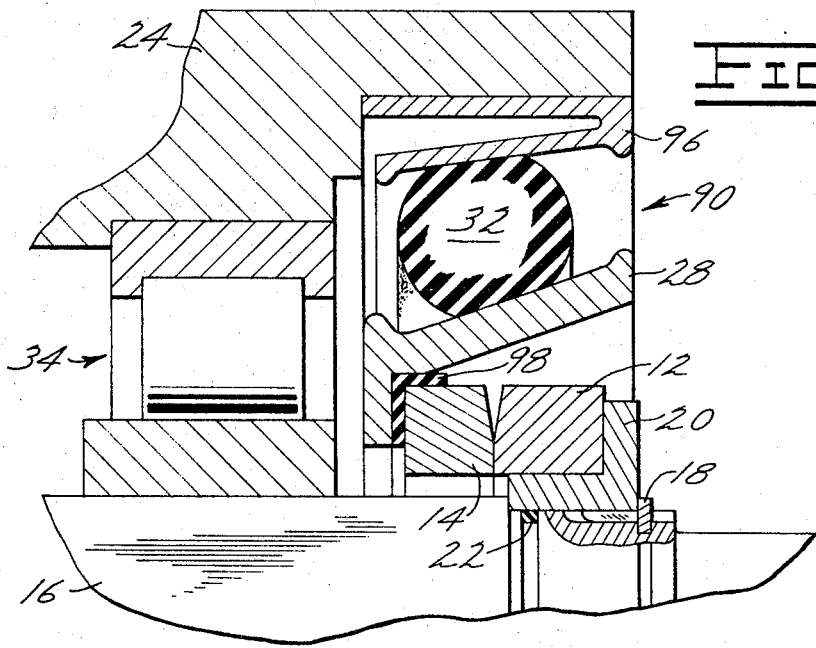

United States Patent Office 3,452,995
Patented July 1, 1969

3,452,995
AXIALLY NARROW METAL FACE SEALS
Frederick S. Engelking, Peoria, Ill., assignor to Caterpillar Tractor Co., Peoria, Ill., a corporation of California
Filed Sept. 21, 1967, Ser. No. 669,538
Int. Cl. F16j 15/38
U.S. Cl. 277—92                          8 Claims

ABSTRACT OF THE DISCLOSURE

An axially compact face seal has a pair of small section seal rings. One of the rings is loaded by a resilient O-ring which is compressed between a pair of convergent cones. The cones are concentrically disposed within one another and about the pair of seal rings to provide an axially compact configuration. One embodiment of the invention includes a thermally responsive spring for compensating for thermal expansion of the O-ring.

BACKGROUND OF THE INVENTION

Conventional lip-type seals deteriorate in heat, are susceptible to fluctuating environmental conditions, such as vibration and eccentricity of related parts, and are also easily damaged during installation. However, such seals continue to be used because no other satisfactory seal has been available which would fit within the limited space requirements so frequently encountered in this field. Experience has proven that metal face type seals are superior in many respects; but in many cases the conventional face seals have been too wide, along their axial direction, to fit into the relatively narrow areas which will accept lip type seals.

The prior art face seals incorporating Duo-Cone O-ring loading arrangements have also presented problems of instability at high rotational speeds. Centrifugal force will distort an O-ring rotating at high speed. If the O-ring associated with the rotating part is eliminated, the single O-ring associated with the non-rotating part supplies the entire face load. This increases the spring rate and makes O-ring expansion with temperature rise more critical.

Typical prior art face seals prevent the flow of oil from the inside diameter of the seal rings to the outside diameter. At high speeds the centrifugal force on the oil forces the oil against the confronting seal rings. This tends to force the rings apart and can cause failure of the seal. The heat generated by rubbing one metal seal ring against another has, as noted generally above, an adverse effect on the resilient torus, or O-ring, which is usually formed of rubber. In most conventional seal designs this heat easily travels through the solid metal to the torus. This heats the torus, which expands and increases the axially applied face load on the seal rings.

This can cause galling and fretting and can cause seal failure.

SUMMARY OF THE INVENTION

The present invention provides an improved face seal having a particularly compact design. The seal comprises a first cone secured to a housing of a shaft bearing assembly and a second convergent cone disposed concentrically or in radial overlap with the first cone. A resilient O-ring is compressed between the convergent confronting cones to supply the face load. The amount of the face load is dependent on the relative axial position of the cones. The other seal ring is secured to a rotating portion of the shaft bearing assembly. The seal rings and both cones are aligned in a radially overlapping or concentric relation and occupy substantially the same axial space to provide the axially narrow face seal of the invention.

Accordingly, the present invention provides a metal face seal configuration which is sufficiently compact to allow its use in the limited space requirements of many lip type seal installations.

The configuration of the invention is particularly adaptable for use with a thermally responsive spring element. The spring compensates for the increased loading forces on the mating interfaces of the seal rings due to the thermal expansion of the O-ring.

BRIEF DESCRIPTION OF THE DRAWINGS

FIGURES 1, 3, 5 and 6 are cross-section views of axially compact, face seals of the invention, utilizing a single O-ring.

FIGURES 2 and 7 are cross-section views of alternative embodiments utilizing pairs of O-rings.

DETAILED DESCRIPTION OF THE PREFERRED EMBODIMENTS

Figure 3:
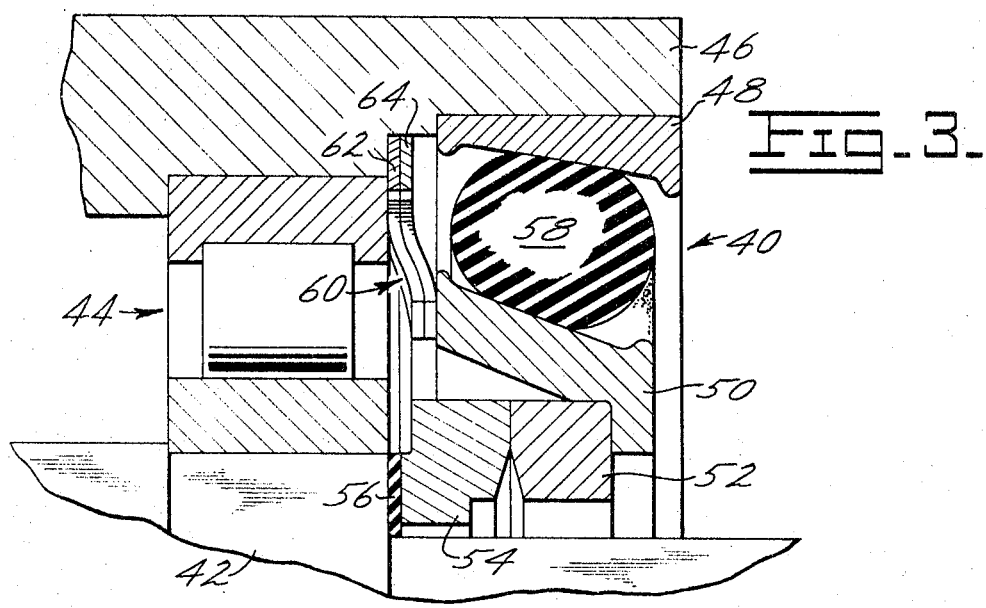

Referring to FIGURE 1 a compact face seal indicated generally by the reference numeral 10 includes a pair of metal seal rings 12 and 14. Ring 12 is a rotating seal ring and is secured to a rotatable shaft 16 by lock ring 18 and a spline driven flanged spacer 20, which in turn is sealed with relation to the shaft 16 by an O-ring 22. The flanged spacer 20 is bonded to the seal ring 12 by a suitable adhesive such as an epoxy.

The second, stationary seal ring 14 is mounted within a housing 24 through a resilient loading means indicated generally by numeral 26. The loading means 26 include a pair of cooperating, concentric cones or ramp members 28 and 30 having opposed convergent conical ramps 29 and 31. A resilient O-ring or torus 32 is compressed between the conical ramps in an amount dependent on the relative axial positions of the ramp members 28 and 30. Moving the ramp 28 to the right, as viewed in FIGURE 1, increases the compression of the O-ring and increases the face load of the seal rings 12 and 14.

The concept of loading by the cones 28 and 30 and the resilient torus 32 is shown and described in greater detail in U.S. Patent No. 3,180,648 to Kupfert et al. assigned to the same assignee as this application.

The cones 30 acts as a seal retaining cone and is sealed within an annular bore formed in the housing 24, and the cone 28 is bonded to the seal ring 14. The confronting surfaces may be lapped and then sealed by means of an epoxy bond to prevent leakage of oil.

The abutting sealing faces 12′ and 14′ of seal rings 12 and 14 are precision ground and lapped.

The shaft 16 rotates within the housing 24, and the seal of the present invention, which will accommodate some axial movement of the shaft 16 within the housing 24 as described in greater detail below, can be used in combination with a roller bearing 34.

FIGURE 3 shows an alternative embodiment 40 of a compact seal. Seal 40 is similar to seal 10 of FIGURE 1, except that the component members are reversed. Thus, a shaft 42 rotates within a bearing 44 which in turn is supported within a housing 46. A seal retaining cone 48 is sealed within the housing 46, and the cone 50 is bonded to a stationary seal ring 52.

In this seal configuration, a rotating seal ring 54 is secured to the rotating shaft 42 by an insulating gasket 56. The gasket 56 may be made of cork and is bonded to the ring and to the shaft.

An O-ring 58 is disposed between the concentric cones 48 and 50, as in the seal 10 of FIGURE 1.

The seal arrangements of FIGURES 1 and 3 (as well as of FIGURES 5 and 6 described hereinafter) provide an advantage in that the problem of centifugal force is minimized since the resiliently loaded seal ring 14 or 52, as well as the torus itself, is stationary. Thus, the single, stationary torus seal design is particularly well suited to high rotational speed applications.

As noted above, the face load must be kept within a narrow range to produce an effective seal while still avoiding fretting and galling. With a single O-ring the problem of thermal expansion of the O-ring can be accentuated. All of the face load is developed by one O-ring. The material of the O-ring expands at a much greater rate than the material of the seal rings and greater thermal expansion of the O-ring can cause the face load to become excessive unless adequate provision is made for accommodating this expansion.

The seal 40 of FIGURE 3 includes a thermally responsive spring 60. The spring is utilized to balance the overload which would be caused by the O-ring 58 when it expands due to heat generated by the seal rings 52 and 54.

Figure 4:
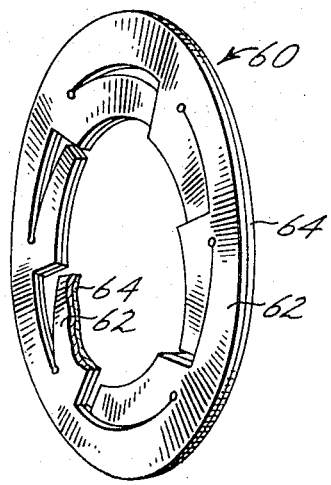
FIGURE 4 is a perspective view of a thermal spring which may be employed in conjunction with the seals.

As best illustrated in FIGURE 4, the spring 60 is formed of two layers 62 and 64 of different metals to define a bimetallic spring. The two layers 62 and 64 respond differentially to the heat, to create a precisely calibrated balancing force which compensates for any increased loading which would be caused by an expanding torus. In the spring 60 the softer metal layer 62 expands more rapidly than its harder complementing layer 64. The strips deflect against the cone 50 to apply the balancing force against the cone 50 at substantially the same rate that the torus 58 increases its loading due to the increasing heat.

Various other bimetallic spring configurations are possible. For example, spring 60 may be replaced by a coil spring (not shown) which is formed of a strip of bimetallic spring material.

The thermal spring may also counterbalance a resilient mounting ring which has a negative rate of expansion with an increase in operating temperature; that is, a torus which contracts with increasing heat rather than expanding as previously described.

The force applied by a thermally responsive spring means, such as those described herein, may be applied to the cone from either side.

FIGURE 2 shows an alternative embodiment 65 of the axially compact seal of the invention. The seal 65 uses a dual resilient loading means which provide a compact seal capable of accommodating axial deflections without excessive change of the interface loading of the mated seal rings.

Housing 66 has an annular bore to receive a first seal retaining cone 68. A second cone 70 is concentrically disposed within the cone 68, and a torus 72 is confined therebetween. A stationary seal ring 74 is bonded to the cone 70, and the components 68–74 have a configuration similar to that described in FIGURE 1. However, the embodiment 65 also includes a second resilient loading means. Thus, a third cone 76 is bonded to a shaft 78 which passes through, and is rotatably supported by, a roller bearing 80. A fourth cone 82 is generally concentrically disposed about the cone 76, and a torus 84 is confined between the cones 76 and 82. A rotating seal ring 86 is bonded to the cone 82 in the manner previously described. The seal rings 86 and 74 are in confronting relation to provide the rotary fluid seal.

Although the seal of FIGURE 2 is not as well adapted to high speed applications, due to the fact that torus 84 rotates and is thus subjected to centrifugal force, the dual resilient loading means configuration is particularly useful in applications wherein a certain amount of axial deflection must be tolerated. The seal of FIGURE 2 provides the axial deflection compensation while further providing the axially compact, metal, face type seal configuration of the invention.

Figure 7:
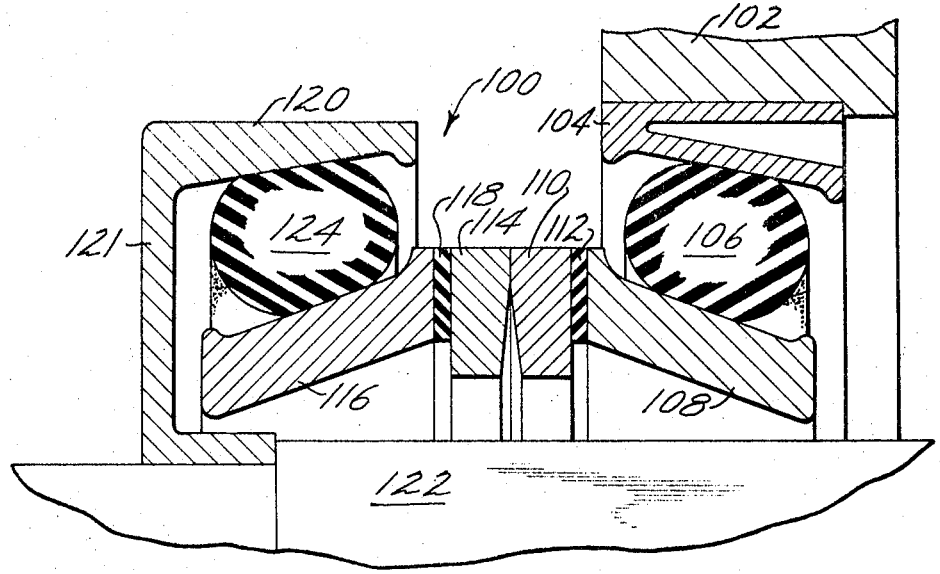

FIGURES 5 and 6 show further alternative embodiments 88 and 90 of the invention. The illustrated embodiments are similar to the seal configurations 40 and 10 of FIGURES 3 and 1. However, embodiments 88 and 90 include in addition a heat dam and thermally compensated face load arrangement. FIGURES 5, 6 and 7 provide the thermally compensated face load by adapting one of the cones.

Referring to FIGURE 5, a seal retaining cone 92 is disposed within the annular groove in the housing 46, and the various additional components are numbered in accordance with similar components of FIGURE 3. As may be seen in FIGURE 5, the thermal spring 60 is not included in embodiment 88, and stationary seal ring 52 is bonded to the cone 50 by an intermediate, insulating gasket or washer 94 which serves as a heat dam. The gasket 94 has a generally right angle cross-section.

The seal retaining cone 92 is formed of a high thermal expansion material such as aluminum, zinc or plastics and has a split cross-section which generally defines a V. As heat is generated within the seal, the leg 92' expands in a manner to cause the V-shape to pinch together. This action increases the inside diameter of the cone 92 which is in contact with the torus 58, and further causes a decrease in the ramp angle which bears against the torus 58. Both of these changes reduce the face load exerted by the torus 58 on the seal ring 52 in proportion to the heat generated, whereby the unavoidable thermal expansion of the torus 58 is compensated. Thus, the split cone 92 defines a thermal compensation means for varying the loading force exerted by the loading means on the seal rings.

In FIGURE 6, a similar seal retaining split cone 96 is utiilzed in the embodiment 90 wherein the remaining components are numbered in accordance with similar components in FIGURE 1. The resilient loading means is, however, formed of the cone 28, the torus 32 and the split cone 96. Further, an intermediate insulating gasket 98 is bonded between the stationary seal ring 14 and the cone 28 to provide a sealed and heat insulating bond.

FIGURE 7 shows still another embodiment 100 of the invention. The configuration is generally similar to that described in the above mentioned U.S. Patent No. 3,180,-648. However, in embodiment 100 a housing 102 supports a seal retaining split cone 104 of the type described in FIGURES 5 and 6. As previously discussed, the cone 104 provides thermal compensation for heat generated within the seal. A torus 106 is confined between the cone 104 and a second cone 108 disposed concentrically within cone 104. A seal ring 110 is bonded to the cone 108 by means of a heat insulating washer 112. A seal ring 114 is supported in confronting, sealed relation against the ring 112 by means of a cone 116. An intermediate heat insualting washer 118 is bonded to the ring 114 and cone 116. A supporting cone 120 is concentrically secured by an integrally formed support flange 121, secured to a shaft 122 rotatably supported within the housing 102 within cone 116. A torus 124 is confined between the cones 116 and 120. Depending upon the particular application, the shaft 122 may rotate within the housing 102, or the housing 102 may rotate about the shaft 122.

The cones 108 and 116 may be inexpensively formed by stamping it from steel.

Where speeds are relatively low and generated frictional heat is not a problem, and where corrosive conditions are absent, the seal ring 110 and the insulating washer 112 may be omitted. In that event, the end of cone 108 is carburized, hardened and lapped to provide a seal surface which confronts the seal surface of the seal ring 114. This construction provides a low cost, wear resistant seal.

The FIGURE 7 embodiment may be further modified by omitting the cone 116, the torus 124 and the supporting cone 120. The seal ring 114 may be secured to the shaft 122 by a flanged spacer (not shown) similar, for example, to the spacer 20 of FIGURES 1 or 6. The insulating washer 118 is bonded between the ring 114 and the flanged spacer, and the latter is suitably secured to the shaft 122, for example, by bonding or with key means, or by spline means (not shown).

Although the present invention has been described herein with reference to several embodiments, various modifications may be made thereto within the spirit of the invention, and thus it is not intended to limit the scope of the invention except as defined by the following claims.

What is claimed is:

1. An axially compact face seal for relatively rotatable parts and comprising, a pair of small section metal seal rings having seal faces engaged in sealing contact, first mounting means connecting one of the seal rings to one of the parts, second mounting means connecting the other seal ring to the other part, at least one of the mounting means including loading means for applying a face load to the seal rings, said loading means including a pair of ramp members having opposed convergent conical ramps and an O-ring compressed between the conical ramps in an amount dependent on the relative axial positions of the ramp members, said ramp members being radially aligned with respect to the seal rings and occupying an axial space which is substantially the same as the axial space occupied by the seal rings, whereby an O-ring suspended metal face seal is sufficiently axially compact for installation in narrow width seal applications.

2. A face seal as defined in claim 1 wherein one of the seal rings and related mounting and loading means are associated with a stationary part and the other mounting means connecting the other seal ring to the other, rotating part do not include a compressible O-ring whereby the single, stationary O-ring is not subjected to centrifugal force and the face seal is thereby more adaptable to use in high rotational speed seal applications.

3. A face seal as defined in claim 1 including a thermally responsive spring associated with the loading means to compensate for temperature changes during operation of the face seal.

4. A face seal as defined in claim 3 wherein the spring engages one of the ramp members and expands on rising temperatures to push the ramp member in an axial direction opposed to the direction the ramp member would be moved by expansion of the O-ring.

5. A face seal as defined in claim 1 wherein each mounting means includes an O-ring loading means as defined in claim 1 and wherein one set of conical ramps is located radially outwardly of the seal rings and the other set of conical ramps is located radially inwardly of the seal rings whereby the loading means can resiliently compensate for a substantial amount of axial shifting of the relatively rotatable parts.

6. A face seal as defined in claim 1 wherein one of the ramp members is V-shaped in cross-section and is made of high thermal expansion material and is disposed with respect to the O-ring in a manner such that thermal expansion of the ramp member increases the space between the conical ramps and reduces the ramp angle of convergence to compensate for thermal expansion of the O-ring.

7. A face seal of the kind in which relatively rotatable metal seal rings have seal faces engaged in sealing relation and the face load is developed by an O-ring loading means comprising a pair of ramp members having opposed convergent conical ramps and an O-ring compressed between the conical ramps in an amount dependent on the relative axial position of the ramp members, said face seal including an insulating washer between a seal ring and an associated ramp member for minimizing the transfer of the heat developed by sliding contact of the seal ring from the seal ring to the ramp member and O-ring whereby the problems of thermal expansion and variations of face load due to thermal expansion of the O-ring are minimized.

8. A face seal as defined in claim 7 wherein one of the ramp members is V-shaped in cross-section and is made of high thermal expansion material and is disposed with respect to the O-ring in a manner such that thermal expansion of the ramp member increases the space between the conical ramps and reduces the ramp angle of convergence to compensate for thermal expansion of the O-ring.

References Cited
UNITED STATES PATENTS

| | | | |
|---|---|---|---|
| 3,403,916 | 10/1968 | Durham et al. | 277—92 |
| 2,879,093 | 3/1959 | Dolhun | 277—96 X |
| 3,096,096 | 7/1963 | Banks | 277—117 |
| 3,180,648 | 4/1965 | Kupfert et al. | 277—92 |
| 3,216,513 | 11/1965 | Robbins et al. | 277—92 X |

FOREIGN PATENTS

| | | |
|---|---|---|
| 63,587 | 4/1955 | France. |

JAMES KEE CHI, *Primary Examiner.*

U.S. Cl. X.R.

277—42